US008843456B2

(12) United States Patent
Christian et al.

(10) Patent No.: US 8,843,456 B2
(45) Date of Patent: Sep. 23, 2014

(54) DATABASE TABLE COMPRESSION

(71) Applicant: International Business Machines Corporation, Armonk, NY (US)

(72) Inventors: Andreas Christian, Karlsruhe (DE); Joern Klauke, Petersberg (DE); Sergiy Malikov, Muehlhausen (DE); Jens Seifert, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/690,346

(22) Filed: Nov. 30, 2012

(65) Prior Publication Data

US 2014/0156609 A1    Jun. 5, 2014

(30) Foreign Application Priority Data

Dec. 6, 2011  (EP) .................................. 11192043

(51) Int. Cl.
*G06F 17/30*   (2006.01)

(52) U.S. Cl.
USPC ............. 707/693; 707/803; 341/55; 382/232; 382/243

(58) Field of Classification Search
CPC .................. G06F 17/30153; Y10S 707/99942
USPC ............. 707/693, 803; 382/232, 243; 341/55
See application file for complete search history.

(56) References Cited

U.S. PATENT DOCUMENTS

| | | | |
|---|---|---|---|
| 6,518,895 B1 * | 2/2003 | Weiss et al. ..................... 341/67 |
| 6,633,674 B1 * | 10/2003 | Barnes et al. ................. 382/232 |
| 6,879,266 B1 * | 4/2005 | Dye et al. ......................... 341/51 |
| 7,190,284 B1 * | 3/2007 | Dye et al. ......................... 341/51 |
| 2006/0061795 A1 * | 3/2006 | Walmsley .................... 358/1.14 |
| 2006/0132822 A1 * | 6/2006 | Walmsley .................... 358/1.14 |
| 2006/0139681 A1 * | 6/2006 | Walmsley .................... 358/1.14 |
| 2006/0164454 A1 * | 7/2006 | Walmsley et al. .............. 347/14 |
| 2006/0294312 A1 * | 12/2006 | Walmsley ..................... 711/122 |
| 2007/0083491 A1 * | 4/2007 | Walmsley et al. ................ 707/3 |
| 2008/0033989 A1 * | 2/2008 | Cha et al. .................... 707/103 R |
| 2008/0154928 A1 * | 6/2008 | Bashyam et al. ............. 707/101 |
| 2008/0194676 A1 | 8/2008 | Abbas et al. |
| 2008/0294676 A1 * | 11/2008 | Faerber et al. ................ 707/102 |
| 2009/0193041 A1 * | 7/2009 | Hornibrook et al. .......... 707/101 |
| 2010/0287144 A1 * | 11/2010 | Cha et al. ...................... 707/693 |
| 2012/0124013 A1 * | 5/2012 | Provenzano ................. 707/692 |
| 2012/0296881 A1 * | 11/2012 | Christian et al. ............. 707/693 |
| 2013/0110766 A1 * | 5/2013 | Promhouse et al. .......... 707/607 |

* cited by examiner

*Primary Examiner* — Hanh Thai

(74) *Attorney, Agent, or Firm* — Cantor Colburn LLP; Jeanine Ray

(57) ABSTRACT

Embodiments relate to table compression in a database. The database is organized in tables including rows and columns An aspect includes defining a range partition of a table of the database according to a first attribute of the table. Internal ranges of the table of the database are defined according to a second attribute of the table. A target internal range of the internal ranges is determined to insert a row as a new entry into the table. A determination is made as to whether an internal range compression directory exists for the target internal range. Based on determining that no internal range compression directory exists for the target internal range and a predefined threshold value of a number of rows is exceeded in the target internal range, the internal range compression directory for the target internal range is created.

17 Claims, 5 Drawing Sheets

DATABASE TABLE COMPRESSION

CROSS-REFERENCE TO RELATED APPLICATION

The present application claims priority to European Patent Application No. 11192043.5 filed on 6 Dec. 2011, and all the benefits accruing therefrom under 35 U.S.C. §119, the contents of which in its entirety are herein incorporated by reference.

BACKGROUND

The disclosure relates generally to database systems, and more particularly to table compression in a database.

In all areas of the industry, the amount of data to be stored is exploding. Also in the field of relational databases, ever growing amounts of data are to be managed. For transactional as well as decision support systems, relational databases may be used. A relational database may store data in the form of tables including rows and columns. It shows that in the rows of relational databases repeated data patterns may be found.

Databases may typically be stored on hard disks. Although hard disk prices are constantly decreasing, the data volume increases and thus, database sizes grow over-proportional. In order to save disk space for data in databases, data compression technologies have been introduced. Existing compression methods may replace most frequent patterns in data with shorter symbols and use dictionaries to map the symbols to the replaced patterns.

A common approach for such a compression method may include usage of fixed length symbols instead of variable length symbols, as this may simplify an implementation of the compression method. For example, a symbol length of 8 bits may allow replacing up to 256 of the most frequent patterns in the data, whereas a symbol length of 16 bits may allow replacing 65,536 of the most frequent patterns in the data.

However, there may be a trade-off between the symbol length and the size of a related compression dictionary. Smaller symbols may require less space, but may reduce the total amount of patterns that can be replaced. Larger symbols allow more patterns to be replaced, but may require more space.

There are several disclosures related to data compression in relational databases. Document US 2009/0193041 A1 discloses obtaining a workload specification for a database. Based on the workload specification, candidates of the tables may be identified and ranked. A compression impact may be evaluated for the candidates of the table. A design for the database may be developed specifying at least one of: (i) which of the tables should be compressed, and (ii) which of the tables should not be compressed.

Document US 2008/0294676 A1 discloses methods and apparatus for compression of tables based on the occurrence of values. In general, a number representing an amount of occurrences of a frequently occurring value in a group of adjacent rows of a column may be generated. Furthermore, a vector representing whether the frequently occurring value exists in a row of the column may be generated, and the number and the vector may be stored to enable searches of the data represented by the number and the vector.

However, there may be a need to overcome a limited amount of supported replacement symbols with a given symbol length, and hence to overcome limited compression rates.

SUMMARY

Embodiments include a method, system, and computer program product for table compression in a database. The database is organized in tables including rows and columns. An aspect includes defining a range partition of a table of the database according to a first attribute of the table. Internal ranges of the table of the database are defined according to a second attribute of the table. A target internal range of the internal ranges is determined to insert a row as a new entry into the table. A determination is made as to whether an internal range compression directory exists for the target internal range. Based on determining that no internal range compression directory exists for the target internal range and a predefined threshold value of a number of rows is exceeded in the target internal range, the internal range compression directory for the target internal range is created.

Another aspect is a system including a table compression module for table compression in a database. The database is organized in tables including rows and columns The table compression module includes a partition definition unit configured to define a range partition of a table of the database according to a first attribute of the table. A range definition unit is configured to define internal ranges according to a second attribute of the table. A range determination unit is configured to determine a target internal range out of the internal ranges for a row to be inserted as a new entry into the table. A creation unit is configured to create the internal range compression directory for the target internal range in case no internal range compression directory exists for the target internal range and a predefined threshold value of a number of rows is exceeded in the target internal range.

Yet another aspect includes a computer program product for table compression in a database. The database is organized in tables including rows and columns The computer program product includes a computer readable storage medium having computer readable program code configured to define a range partition of a table of the database according to a first attribute of the table. Internal ranges of the table of the database are defined according to a second attribute of the table. A target internal range of the internal ranges is determined to insert a row as a new entry into the table. A determination is made as to whether an internal range compression directory exists for the target internal range. Based on determining that no internal range compression directory exists for the target internal range and a predefined threshold value of a number of rows is exceeded in the target internal range, the internal range compression directory for the target internal range is created.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
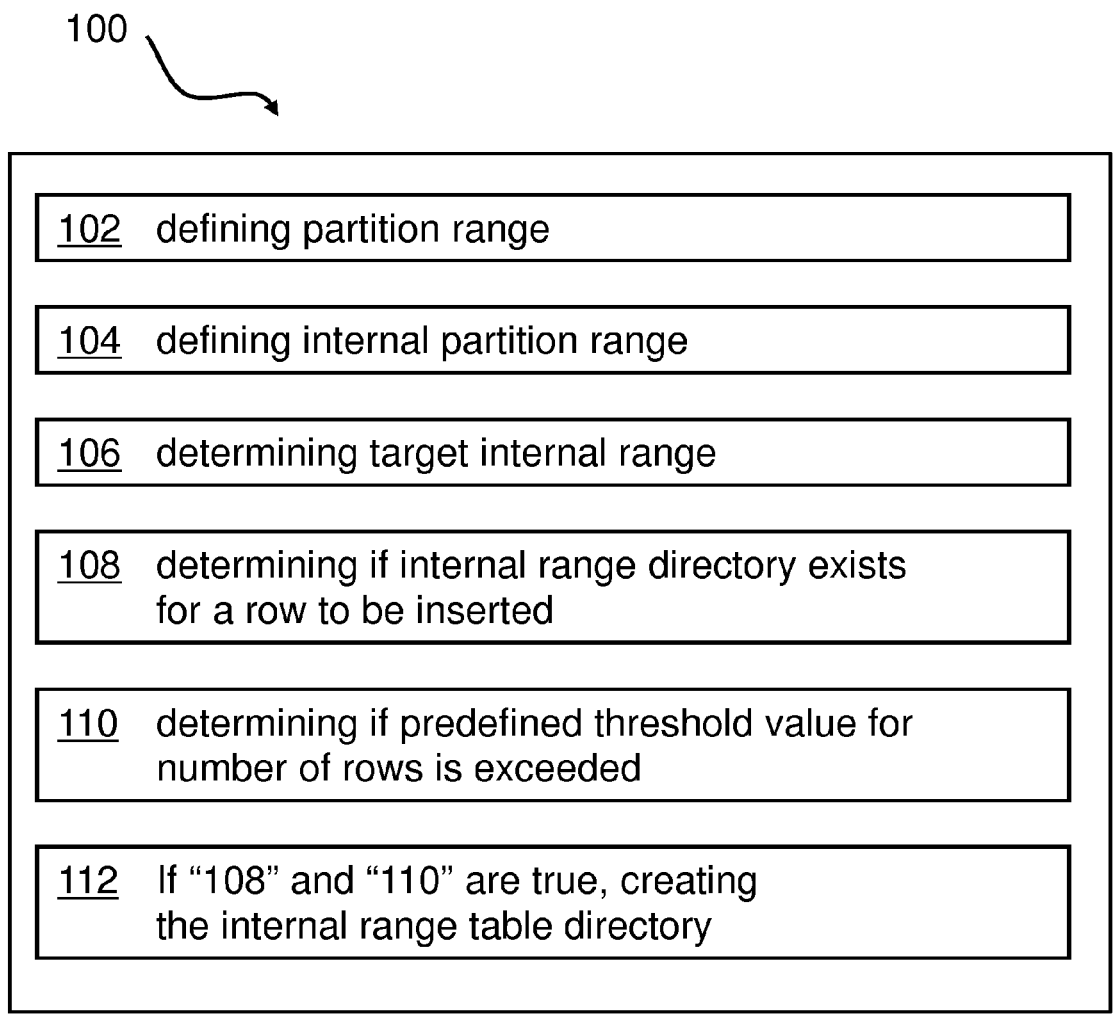
FIG. 1 shows a block diagram of an embodiment of a method for database table compression.

Embodiments of database table compression are provided, with exemplary embodiments being discussed below in detail. According to one embodiment, a method for table compression in a database is provided. The database may be organized in tables including rows and columns The method may include defining a range partition—in particular, a plurality of range partitions—of a table of the database according to a first attribute of the table, and defining internal ranges according to a second attribute of the table. The method may also include determining a target internal range out of the internal ranges for a row to be inserted as a new entry into the table, and determining whether no internal range compression dictionary may exist for the target internal range, and also determining whether a predefined threshold value of a number of rows may be exceeded in the target internal range. If these conditions are met, the internal range compression dictionary for the target internal range may be created.

According to another embodiment, a table compression module for table compression in a database may be provided. The database may be organized in tables including rows and columns. The table compression module may include a partitioning unit adapted for defining a range partition, in particular, a plurality of range partitions for a table of the database according to a first attribute of the table. The table compression module may also include a range definition unit adapted for defining internal ranges according to a second attribute of the table. Furthermore, the table compression module may include a range determination unit adapted for determining a target internal range out of the internal ranges for a row to be inserted as a new entry into the table, and a creation unit adapted for creating the internal range compression dictionary for the target internal range in case no internal range compression dictionary may exist for the target internal range and a predefined threshold value of a number of rows may be exceeded in the target internal range. Both conditions may be met before the creation unit may become active.

If one range partition is defined for the table, the range partition may span the entire table. This may mean that no partitioning has been done for the table. The first attribute may be a column of the table, or other sorting criteria of the table. The first attribute and the second attribute may not be identical attributes. As a consequence, rows related to one internal range may be distributed across different range partitions, and internal ranges may split partition ranges into smaller internal ranges.

In the context of this application, the following conventions may be followed:

Table compression—The term "table compression" may denote a process or technique for reducing the number of stored bytes in a database row by replacing bit or byte patterns that may be repeated by symbols or replacement symbols, which have a smaller length of characters. If a plurality of such pattern may be replaced by the symbols, and a translation table or "dictionary" between symbols and patterns may allow switching forth and back between symbols and patterns, then required storage space may be reduced.

Database—The term "database" may denote a data organization, in which data may be organized in rows and columns in one or more tables. Typically, this may be done in a relational database.

Attribute—The term "attribute" may denote an object characterizing features of a row of the table. Typically, a column of the table may be defined as an attribute.

Range partition—The term "range partition" may denote a partition or part of a logical database or its constituting elements into distinct independent sections. Database partitions may normally be defined for manageability, performance, or availability reasons. For example, a database table with a customer surname as a primary key may be divided into ranges, such that all names starting with the same letter may be stored within a separate range partition. This may have the advantage that if, for example, one range partition—e.g., all customer data having a related customer surname starting with an "R"—may be archived and thus, may be locked for write access. The database system, and thus, a user, may work with all remaining surnames, which may not be archived.

Internal range—The term "internal range" may denote another logical partitioning of a table of a database. Internal ranges may be characterized by a second attribute of the table, which may be different to the first attribute as described in the context of range partitions. This may have the consequence, that rows for a defined internal range may be distributed across range partitions. Thus, this may not express that an internal range may split range partitions into smaller sections. An attribute may again be a column or column name.

Row—The term "row" or record may denote an entry in a database. A row may include several data fields. The data fields may have fixed or variable lengths. Often, primary and potentially secondary keys may be defined for rows of a database. The separate data fields of a row may be used as attributes for defining primary or secondary keys.

Global pattern—The term "global pattern" may denote a pattern that may relate to a complete database table.

Global compression directory—This term may denote a translation table between symbols and data patterns related to more than one table, in particular, a plurality of tables, e.g., all tables of a database.

Table space dictionary—This term may denote a translation table for compression, which may be applicable for a table space.

Table-global dictionary—This term may denote a translation table for compression, which may be applicable for a specific table.

Internal range compression directory—This term may denote a translation table for compression, which may only be applicable for a specific internal range, and thus, only for a part of a database table.

Most frequent range patterns—This term may denote patterns that are most frequent within a given range.

Most frequent table-global pattern—This term may denote patterns that are most frequent within a table.

Fixed-length table compression—This term may relate to a conventional table compression method, in which fixed-length replacement symbols may replace longer bit patterns and reduce the total amount of required storage space for the table plus the dictionary.

The proposed method for table compression may offer multiple advantages. In particular, the described method may allow higher compression rates for database tables and thus, for databases in general. These higher compression rates may be based on the fact that more than one compression dictionary may be used for a given database table. There may be a table-global compression dictionary, as well as internal range compression dictionaries. Each internal range may have its own internal range compression dictionary, allowing data compression on an internal range basis. It should be understood that this may be independent of range partitions. As defined above, internal ranges may be defined using a second attribute, which may be different than a first attribute used for a range partitioning of a table. Also, range partitions may be a basis for a data compression. Overall, required disk space may be reduced using the disclosed compression technique.

Thus, the limited compression rates of conventional compression techniques may be overcome by using multiple dictionaries for a single table because certain frequent replacement patterns may only occur in certain ranges of the table. For example, a table may be used for tracking data about product shipments. The table may store information such as products, quantities and supplier. Part of this information may be time dependent. For example, the supplier of a product may change over time. Hence, there are internal ranges which may only contain supplier name A and another internal range which may only contain supplier name B. In this example, the supplier names are correlated with time. Correlation with time is a common case in real life data.

Therefore, a larger amount of replacement symbols may be used without the need to increase the symbol length. With a larger amount of replacement symbols, the potential compression rate may increase. Additionally, records may contain compression symbols from global and local dictionaries. Moreover, the length of the replacement symbols may not need to be increased to support more replacement symbols.

Another aspect is related to a degradation of compression rates overtime as new data may be inserted into the table. This aspect may be overcome by creating additional local dictionaries for a table later on as additional rows or records may be inserted into new ranges in the table. Moreover, a creation of new local dictionaries for new ranges of records may be done much faster than to rebuild the global dictionary and reorganizing the entire table, as may be the case in conventional table compression techniques. Furthermore, by storing common patterns only in the global dictionary, the size of the dictionaries may be kept small. The number of local dictionaries may be adjusted as needed. For larger tables, more local dictionaries may be used to improve compression rates of these tables.

The approach described herein, i.e., using multiple internal range compression dictionaries for different ranges of records has been tested with real customer data from an SAP Business Warehouse. It provided additional space savings of up to 30% compared to an approach using a single compression dictionary for an entire table.

In one embodiment of the method, the method may include additionally performing a fixed-length table compression for the target internal range using fixed-length replacement symbols and using the created internal range compression dictionary such that the target internal range within the table may be compressed. With this, an additional data compression within a database table may be performed, reducing the required storage space on a hard disk.

In a further embodiment of the method, a predefined number of most frequent table-global patterns in the table may be established. Based on this, a data compression may be performed within the complete table.

In another embodiment of the method, the method may also include creating a table-global dictionary based on fixed-length replacement symbols for storing the most frequent table-global patterns for the table. In this way, a data compression may be performed across different internal ranges. Data patterns, that may not be repeated in a large number of cases within one internal range, may, however, be repeated if comparing different internal ranges. In this way, cross-range data compression may be performed.

In a specific embodiment of the method, twice the most frequent range patterns in the internal range may be determined for each internal range. It may be noted that the predefined number may have been defined in the context of the whole table.

In a further embodiment of the method, the method may also include for each internal range, comparing the most frequent range patterns with the most frequent table-global patterns and removing those range patterns from the internal range compression dictionary that may be identical to any of the most frequent table-global patterns resulting in remaining range patterns. Furthermore, a fixed-length table compression using fixed-length replacement symbols for each internal range, based on the predefined number of most frequent range patterns out of the remaining range patterns, may be performed as part of this embodiment. In this way, an even higher compression rate may be achieved, which may save even more disk space.

In a further embodiment of the method, the method may also include creating a global compression dictionary for a plurality of tables. Where the plurality of tables includes all tables of a database, a true global compression dictionary may be generated for all existing tables. Otherwise, multiple global compression dictionaries may be used. It may also be possible to use table space compression dictionaries.

In addition to the previously described embodiments, in a further embodiment, each fixed-length replacement symbol may include a dictionary symbol indicative of a type of a dictionary, where the type of the dictionary may be selected from the group consisting of the internal range compression dictionary, the table-global dictionary, a table space compression dictionary, and the global compression dictionary. Thus, within the symbol, it may be coded, which characters of the symbol may have a replacement equivalent.

There may also be an embodiment of the method, where the internal range compression dictionary and the table-global dictionary may be stored together and consecutive in a compression storage area. In particular, the different dictionaries may be linked or chained together. Thus, they may grow dynamically because it may be one flat data structure, which may, for example, be organized as a list, a table, a tree or in another organization form. The advantage of this organization may be easier management because there are no additional management requirements for compression data structures for database tables. It may also result in a simplification in addressing and accessing compressed data. Thus, such a logical compression directory may have performance advantages.

Furthermore, a database system including the table compression module, as described above, and referring to the method for table compression may be provided.

In another embodiment, a data processing program for execution in a data processing system may be provided including software code portions for performing the method, as described above, when the program may be run on a data processing system. The data processing system may be a computer or computer system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments have been described with reference to different subject-matter. In particular, some embodiments have been described with reference to methods, whereas other embodiments have been described with reference to systems or apparatuses. However, a person skilled in the art will gather from the above and the following description that, unless otherwise notified, in addition to any combination of features belonging to one type of subject-matter, also any combination between features relating to different subject-matter, in particular, between features of the methods, and features of the systems or apparatuses, is considered as to be disclosed within this document.

The aspects defined above and further aspects are apparent from the examples of embodiments described hereinafter and are explained with reference to the examples of embodiments but is not so limited.

In the following, a detailed description of the figures will be given. All instructions in the figures are schematic. Firstly, a block diagram of an embodiment of a method for table compression for a database is given. Afterwards, embodiments of the method and a table compression module will be described.

FIG. 1 shows a block diagram of an embodiment of a method 100 for table compression for a database. The database may be organized in tables including rows and columns, hence, a relational database. The method may include defining, 102, a range partition of a table of the database according to a first attribute of the table, and defining, 104, internal ranges of the table of the database according to a second attribute of the table. The method may further include determining, 106, a target internal range out of the internal ranges for a row to be inserted into the table. Typically, every record or row to be inserted may fall into one respective internal range. Additionally, the method may include determining, 108, whether no internal range compression directory exists for the target internal range, and determining, 110, whether a predefined threshold value of a number of rows is exceeded in the target internal range, and based on this, creating, 112, the internal range compression directory for the target internal range. The determination of the target internal range may be performed using conventional techniques based on sorting of records on an attribute.

Figure 2:
FIG. 2 shows a block diagram of an embodiment for a conventional database table compression process.
Figure 2:
Figure 2:

FIG. 2 shows a block diagram 200 of an embodiment for a conventional database table compression technique. A database table 202 may have the columns or attributes "name", "department", abbreviated as "dept.", "salary", "city", and "state". As an example, three entries are shown for "Miller", "Smith", and "Johnson". In row before compression 204, a conventional non-compressed storage organization is shown. The records are stored one after the other. However, it may be recognized that certain patterns may be repeated, like, e.g., "3875" or "Dallas, Tex.". These patterns may be compressed by using replacement symbols instead of the complete patterns. In this case, the symbol "01" is used for the pattern "3875" and the symbol "02" is used for the pattern "Dallas, Tex.". Row after compression 206 shows a section of the compressed storage organization. A translation table or compression directory 208 may store the replacement symbols and the corresponding patterns for later decompression.

Figure 3:
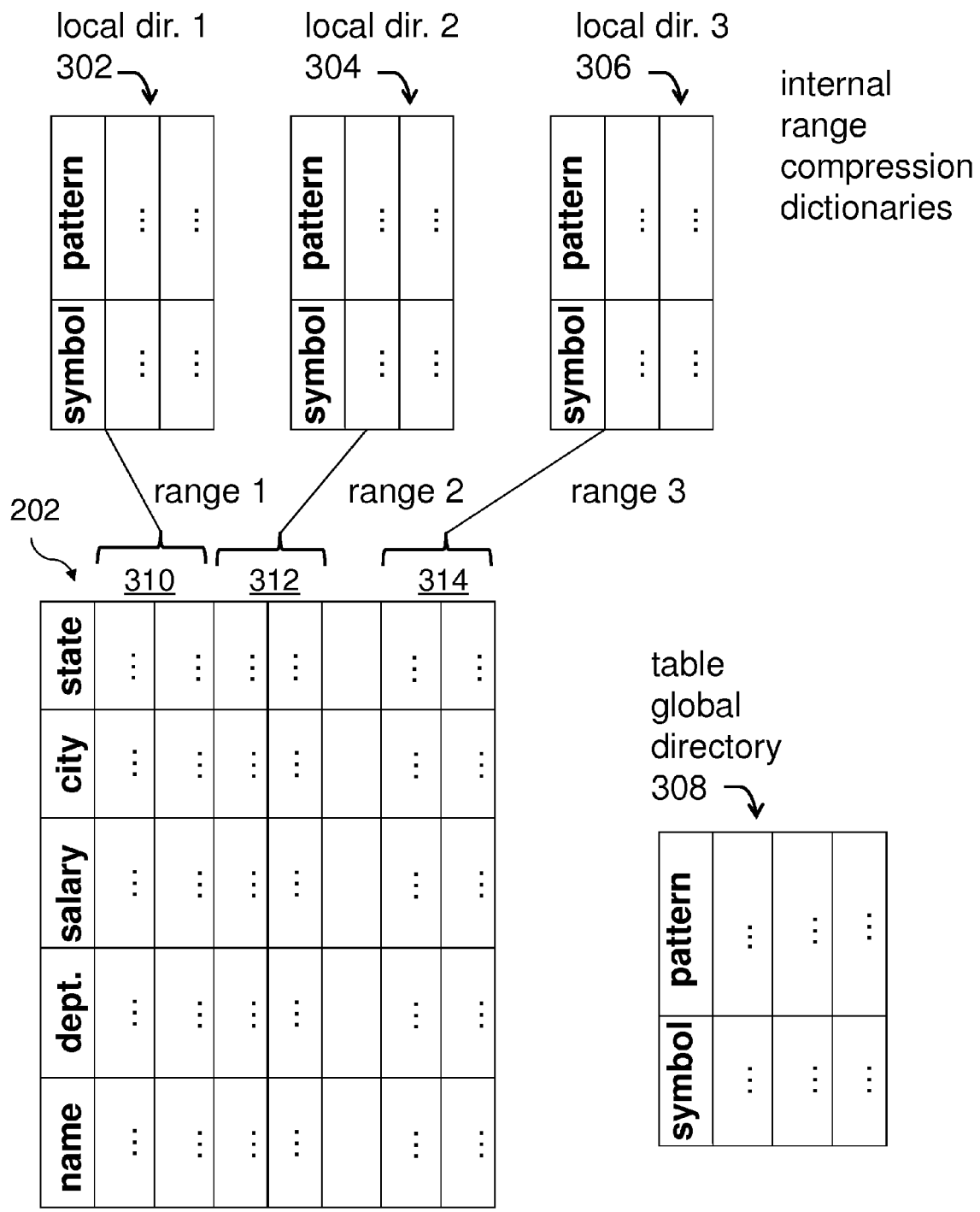
FIG. 3 shows a block diagram of an embodiment of database table compression based on internal ranges.

FIG. 3 shows a block diagram of an embodiment of database table compression based on internal ranges. As an example, table 202 is used again. However, specific row content is not depicted in FIG. 3. As an example, rows 1 and 2 are shown as a first internal range 310, rows 3 and 4 are shown as a second internal range 312 and row N-1 and row n are shown as a third range representing a third internal range 314. "N" may be the number of rows in the table. However, it is understood that ranges may not only include two consecutive rows but any larger number of rows. And, because an attribute may be used as an organization criterion for the internal ranges, the rows do not need to be adjacent. An internal range may have members or rows or records in different conventional range partitions (not shown).

A compression directory 308 may be used for compression on a table level. In this case, the compression directory may be called a "table-global directory" 308. It may be noted that other, and additional compression dictionaries may also be used, e.g., a table space compression dictionary and/or a global compression dictionary.

The internal compression table directories 302, 304, 306 may be associated to a range 1, a range 2, and a range 3, and so on, as indicated in FIG. 3.

A symbol length—meaning the number of bits used per replacement symbol—may be chosen as appropriate.

It may be assumed to use symbols of 12-bit length, 2 bits to identify the dictionary and 10 bits to identify the replacement pattern within the dictionary (hence $2^{10}$ different patterns would fit into each of the dictionaries).

Here, it may also be assumed to use the following levels of dictionary types:
00->database global compression dictionary
01->table space compression dictionary
10->table-global dictionary
11->internal range compression dictionary It is assumed that a table may have a column "DATE". The column may have a value range of 2001 to 2008. It is also assumed that the column "DATE" may divide the records into 8 ranges, one for each year. Hence, the following types of compression symbols may be used in the table:
00aaaaaaaaaa->May refer to a symbol in the global compression dictionary.
01bbbbbbbbbb->May refer to a symbol in a table space dictionary.
10cccccccccc->May refer to a symbol in the table-global dictionary.
11dddddddddd->May refer to a symbol in one of the local table dictionaries, i.e., internal range compression dictionaries.

In this case, the first two bits of the replacement symbol are used to differentiate between four different compression dictionaries. The values "aaaaaaaaaa", "bbbbbbbbbb", "cccccccccc", and "dddddddddd" may be used for replacement purposes.

It may also be noted that in contrast to an adaptive compression approach, which is performed in two steps, the proposed approach is a one-step-approach For this one-step approach, a compression storage area may be used. The compression storage area may have different sections, e.g., for a table-global dictionary and several internal range compression dictionaries. Therefore, the compression storage area may grow with the amount of records in the internal ranges. This means that if an internal range includes a sufficient number—i.e., a predefined number—of records, the replacement symbols may be generated and stored in the compression storage area. The following example may make this even clearer.

a) In this example, only table-global and table-local, i.e., per internal range, symbols may be used.
  b) Replacement symbols may have a length of 3 bits.
  c) The leading bit may be used for a differentiation between a table-global and a table-local symbol—i.e., internal range specific.
  d) There may be N ranges, in which already enough records are available per internal range.

Then the following structure may be generated:

| dictionary symbol | table-global replacement patterns |
|---|---|
| 100 | |
| 101 | |
| 110 | |
| 111 | |
| | local replacement patterns range 1 |
| 000 | ... |
| 001 | ... |
| 010 | ... |
| 011 | ... |
| | local replacement patterns range 2 |
| 000 | ... |
| 001 | ... |
| 010 | ... |
| 011 | ... |
| ... | local replacement patterns range N |
| 000 | ... |
| 001 | ... |
| 010 | ... |
| 011 | ... |

Local replacement patterns may be those managed by an internal range compression dictionary.

The following process may be performed to compress/decompress records and maintain the compression dictionaries:

Firstly, determine the N most frequent patterns in the table and use them to build the table-global dictionary. This may be done using conventional fixed-length replacement symbols.

Then, for each range of the table, the following may be performed:
1. Determine the 2*N most frequent patterns in the internal range, eventually, using a conventional sorting method.
2. Compare those 2*N most frequent patterns with the patterns in the table-global dictionary and remove those from the determined 2*N most frequent patterns, which exist in the table-global dictionary.
3. From the remaining patterns, take the N most frequent ones and put them into a local compression dictionary, called the internal range compression dictionary.

In case a new record needs to be inserted into the table, the following process may be performed to compress the record:
1. Determine the internal range into which the record belongs and access the corresponding internal range compression dictionary using known techniques for data insertion.
2. If the record falls into an internal range for which no internal range compression dictionary exists, check if enough records exist in this internal range, and if so, trigger creation of a related internal range compression dictionary, and perform a reorganization and/or compression of existing records in this internal range. The compression may be performed by fixed-length replacement symbols.
3. Compare the data in the record with the patterns in the internal range compression dictionary and replace any matching patterns with the corresponding symbols from the (local) internal range compression dictionary.
4. Compare the data in the record with the patterns in the table-global dictionary and replace any matching patterns with the corresponding symbols from the table-global dictionary.

If a record is read from a table, the following process may be performed to decompress any symbols in the record:
1. If the symbol is a table-global symbol, access the table-global dictionary and retrieve the pattern that corresponds to the symbol.
2. If the symbol is a local symbol, i.e., from an internal range compression dictionary:
  determine the internal range to which the record belongs, and
  access the internal range compression dictionary that corresponds to the internal range and retrieve the pattern that corresponds to the symbol.

With a combination of these operations that may relate to table end record/row manipulation, all typical table manipulations—i.e., read, write, modify, and delete operations—may be performed.

Figure 4:
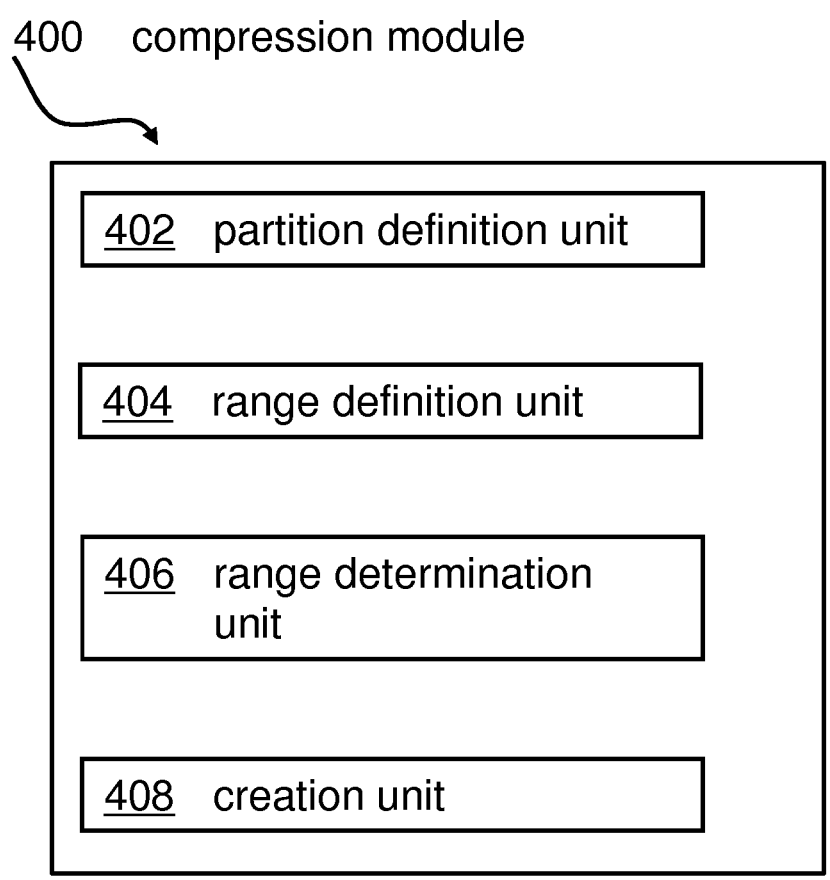
FIG. 4 shows an embodiment of the table compression module.

FIG. 4 shows a block diagram of an embodiment of the table compression module 400 for table compression in a database. The database may be organized in tables including rows and columns. The table compression module 400 may include a partition definition unit 402 adapted for defining a range partition of a table of the database according to a first attribute of the table. The table compression module 400 may also include a range definition unit 404 adapted for defining internal ranges according to a second attribute of the table. Furthermore, a range determination unit 406 adapted for determining a target internal range out of the internal ranges for a row to be inserted as a new entry into the table may be present in the table compression module 400. Additionally, the table compression module 400 may include a creation unit 408 adapted for creating the internal range compression directory for the target internal range in case no internal range compression directory exists for the target internal range and a predefined threshold value of a number of rows is exceeded in the target internal range.

Figure 5:
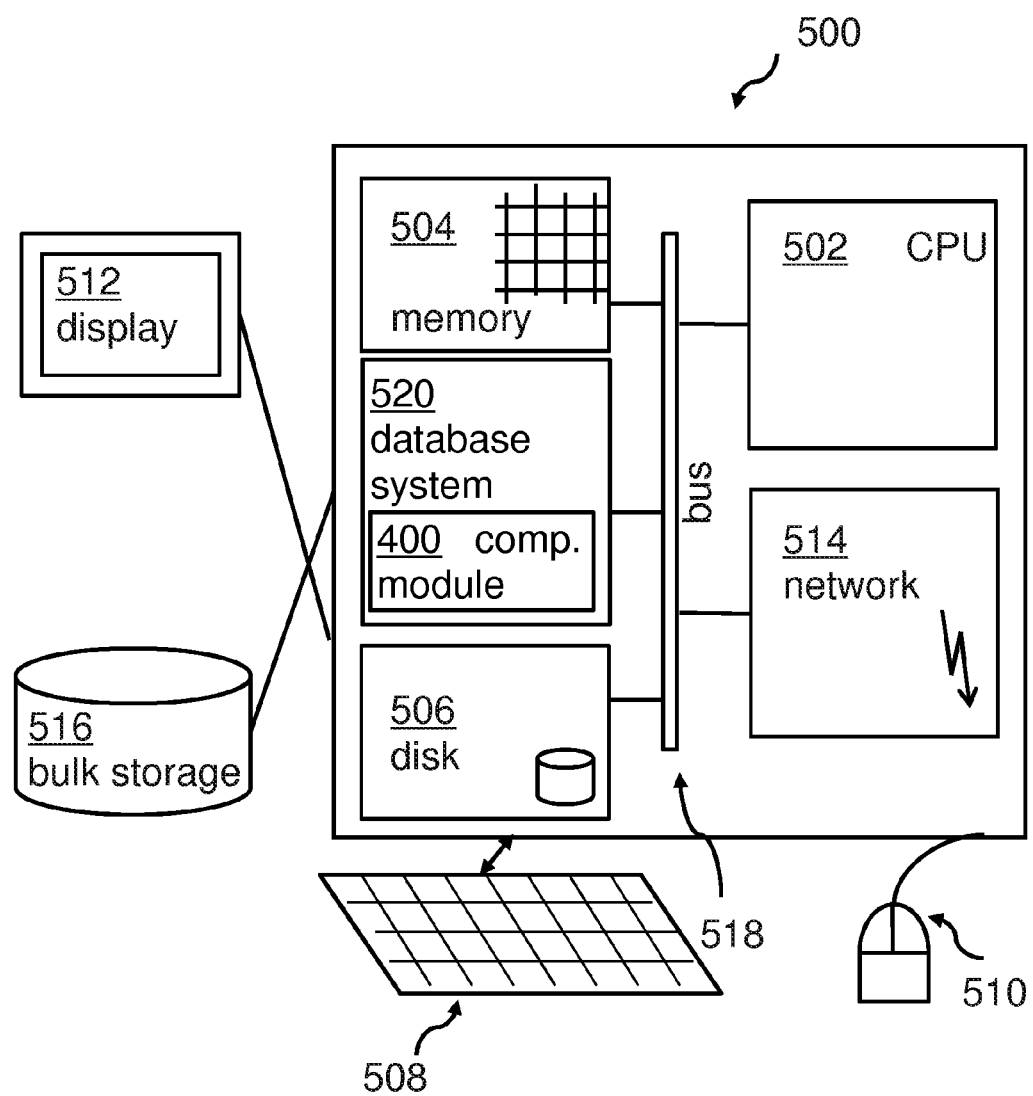
FIG. 5 shows an embodiment of a computing system including the table compression module.

Embodiments may be implemented together with virtually any type of computer, regardless of the platform being suitable for storing and/or executing program code. For example, as shown in FIG. 5, a computing system 500 may include one or more processor(s) 502 with one or more cores per processor, associated memory elements 504, an internal storage device 506 (e.g., a hard disk, an optical drive such as a compact disk drive or digital video disk (DVD) drive, a flash memory stick, etc.), and numerous other elements and functionalities, typical of today's computers (not shown). The memory elements 504 may include a main memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage 516 for an execution. Elements inside the computer 500 may be linked together by means of a bus system 518 with corresponding adapters. Additionally, a database system 520 including the compression module 400 may be attached to the bus system 518. Alternatively, the compression module 400 may be attached directly to the bus system 518.

The computing system 500 may also include input means, such as a keyboard 508, a pointing device such as a mouse 510, or a microphone (not shown). Alternatively, the computing system may be equipped with a touch sensitive screen as main input device. Furthermore, the computer 500, may include output means, such as a monitor or screen 512 [e.g., a liquid crystal display (LCD), a plasma display, a light emitting diode display (LED, OLED), or cathode ray tube (CRT) monitor]. The computer system 500 may be connected to a network, e.g., a local area network (LAN), a wide area network (WAN), such as the Internet or any other similar type of network, including wireless networks via a network interface connection 514. This may allow a coupling to other computer systems or a storage network or a tape drive. Those, skilled in the art will appreciate that many different types of computer systems exist, and the aforementioned input and output means may take other forms. Generally speaking, the computer system 500 may include at least the minimal processing, input and/or output means to practice embodiments.

Those skilled in the art will appreciate that one or more elements of the aforementioned computer system 500 may be located at a remote location and connected to the other elements over a network Further, embodiments may be implemented on a distributed system having a plurality of nodes, where each portion of the compression module 400 may be located on a different node within the distributed system. In one embodiment, the node corresponds to a computer system. Alternatively, the node may correspond to a processor with associated physical memory. The node may alternatively correspond to a processor with shared memory and/or resources or a smartphone.

Further, software instructions to perform embodiments may be stored on a computer readable medium, such as a compact disk (CD), a diskette, a tape, or any other computer readable storage device.

While described with respect to a limited number of embodiments, those skilled in the art, having benefit of this disclosure, will appreciate that other embodiments can be devised, which do not depart from the scope as disclosed herein.

It should also be noted that the term "comprising" does not exclude other elements or steps and "a" or "an" does not exclude a plurality. Furthermore, the term "comprising" may also include the case of "consisting of". Also, elements described in association with different embodiments may be combined. It should also be noted that reference signs in the claims should not be construed as limiting elements.

What is claimed is:

1. A method for table compression in a database, the database organized in tables comprising rows and columns, the method comprising:
   defining a range partition of a table of the database according to a first attribute of the table;
   defining internal ranges of the table of the database according to a second attribute of the table;
   determining a target internal range of the internal ranges to insert a row as a new entry into the table;
   determining whether an internal range compression directory exists for the target internal range;
   based on determining that no internal range compression directory exists for the target internal range and a predefined threshold value of a number of rows is exceeded in the target internal range, creating the internal range compression directory for the target internal range; and
   performing a fixed-length table compression for the target internal range using fixed-length replacement symbols and using the created internal range compression dictionary, such that the target internal range within the table is compressed.

2. The method of claim 1, further comprising:
   creating a table-global directory based on fixed-length replacement symbols for storing most frequent table-global patterns for the tables.

3. The method of claim 1, further comprising:
   determining twice a predefined number of most frequent range patterns in the internal range for each of the internal ranges.

4. The method of claim 3, further comprising:
   for each of the internal ranges:
      comparing the most frequent range patterns with the most frequent table-global patterns;
      removing range patterns from the internal range compression dictionary that are identical to any of the most frequent table-global patterns resulting in remaining range patterns; and
      performing a fixed-length table compression using fixed-length replacement symbols for each internal range based on the predefined number of most frequent range patterns out of the remaining range patterns.

5. The method of claim 1, further comprising:
   creating a global compression dictionary for a plurality of tables.

6. The method of claim 1, wherein each fixed-length replacement symbol comprises a directory symbol indicative of a type of a dictionary, wherein the type of the dictionary is selected from a group comprising: an internal range compression dictionary, a table-global dictionary, a table space compression dictionary, and a global compression dictionary.

7. The method of claim 6, wherein the internal range compression dictionary and the table-global dictionary are stored together and consecutively in a compression storage area.

8. A system comprising a table compression module for table compression in a database in a computer system, the computer system comprising one or more processors, memory elements and the table compression module attached to a bus system, the database organized in tables comprising rows and columns, the table compression module comprising:
   a partition definition unit configured to define a range partition of a table of the database according to a first attribute of the table;
   a range definition unit configured to define internal ranges according to a second attribute of the table;
   a range determination unit configured to determine a target internal range out of the internal ranges for a row to be inserted as a new entry into the table; and
   a creation unit configured to create the internal range compression directory for the target internal range in case no internal range compression directory exists for the target internal range and a predefined threshold value of a number of rows is exceeded in the target internal range, wherein the system is configured to perform a fixed-length table compression for the target internal range using fixed-length replacement symbols and using the created internal range compression dictionary, such that the target internal range within the table is compressed.

9. The system of claim 8, wherein the system is configured to create a table-global directory based on fixed-length replacement symbols for storing most frequent table-global patterns for the tables.

10. The system of claim 8, wherein the system is configured to determine twice a predefined number of most frequent range patterns in the internal range for each of the internal ranges.

11. The system of claim 10, wherein the system is configured to perform for each of the internal ranges:
 comparing the most frequent range patterns with the most frequent table-global patterns;
 removing range patterns from the internal range compression dictionary that are identical to any of the most frequent table-global patterns resulting in remaining range patterns; and
 performing a fixed-length table compression using fixed-length replacement symbols for each internal range based on the predefined number of most frequent range patterns out of the remaining range patterns.

12. The system of claim 8, wherein each fixed-length replacement symbol comprises a directory symbol indicative of a type of a dictionary, wherein the type of the dictionary is selected from a group comprising: an internal range compression dictionary, a table-global dictionary, a table space compression dictionary, and a global compression dictionary.

13. A computer program product for table compression in a database, the database organized in tables comprising rows and columns, the computer program product comprising:
 a computer readable storage medium having computer readable program code configured to:
  define a range partition of a table of the database according to a first attribute of the table;
  define internal ranges of the table of the database according to a second attribute of the table;
  determine a target internal range of the internal ranges to insert a row as a new entry into the table;
  determine whether an internal range compression directory exists for the target internal range;
  based on determining that no internal range compression directory exists for the target internal range and a predefined threshold value of a number of rows is exceeded in the target internal range, create the internal range compression directory for the target internal range; and
  perform a fixed-length table compression for the target internal range using fixed-length replacement symbols and use the created internal range compression dictionary, such that the target internal range within the table is compressed.

14. The computer program product of claim 13, wherein the computer readable program code is configured to create a table-global directory based on fixed-length replacement symbols for storing most frequent table-global patterns for the tables.

15. The computer program product of claim 13, wherein the computer readable program code is configured to determine twice a predefined number of most frequent range patterns in the internal range for each of the internal ranges.

16. The computer program product of claim 13, wherein the computer readable program code is configured to perform for each of the internal ranges:
 comparing the most frequent range patterns with the most frequent table-global patterns;
 removing range patterns from the internal range compression dictionary that are identical to any of the most frequent table-global patterns resulting in remaining range patterns; and
 performing a fixed-length table compression using fixed-length replacement symbols for each internal range based on the predefined number of most frequent range patterns out of the remaining range patterns.

17. The computer program product of claim 13, wherein each fixed-length replacement symbol comprises a directory symbol indicative of a type of a dictionary, wherein the type of the dictionary is selected from a group comprising: an internal range compression dictionary, a table-global dictionary, a table space compression dictionary, and a global compression dictionary.

* * * * *